United States Patent [19]
Nagao et al.

[11] Patent Number: 5,927,428
[45] Date of Patent: Jul. 27, 1999

[54] MOTOR FOR POWER STEERING AND POWER STEERING DEVICE USING THE SAME

[75] Inventors: Yasuhiro Nagao, Okazaki; Tsutomu Shiga, Nukata-gun; Nobuhiko Uryu, Kariya; Yuuji Hashiba, Nagoya, all of Japan

[73] Assignee: Denso Corporation, Kariya, Japan

[21] Appl. No.: 08/768,928

[22] Filed: Dec. 18, 1996

[30] Foreign Application Priority Data

Dec. 19, 1995 [JP] Japan ..................................... 7-330259
Oct. 22, 1996 [JP] Japan ..................................... 8-279561

[51] Int. Cl.⁶ ...................................................... B62D 5/04
[52] U.S. Cl. ........................................................... 180/444
[58] Field of Search .................................. 180/443, 444, 180/445, 446; 475/294; 74/355

[56] References Cited

U.S. PATENT DOCUMENTS 4,416,345  11/1983  Barthelemy ............................. 180/444
5,711,396   1/1998  Joerg et al. .............................. 180/444
5,732,791   3/1998  Pinkos et al. ............................ 180/444

FOREIGN PATENT DOCUMENTS 051 515     5/1982   European Pat. Off. .
3721042     1/1988   Germany .
60-020746   2/1985   Japan .
3-007661    1/1991   Japan .
6-316270   11/1994   Japan .
7-061362    3/1995   Japan .

*Primary Examiner*—Kevin Hurley
*Attorney, Agent, or Firm*—Pillsbury Madison & Sutro LLP

[57] ABSTRACT

In a vehicle power steering device, a motor is turned on to rotate in one direction whether a steering wheel is turned clockwise or counterclockwise. A switching mechanism is interposed between a motor armature shaft and an output shaft to change directions of the output shaft rotation relative to the armature shaft rotation in response to turning direction of the steering wheel. The switching mechanism may include electrically controlled coupling/releasing members or mechanically controlled rotation reversing and coupling mechanisms.

11 Claims, 7 Drawing Sheets

MOTOR FOR POWER STEERING AND POWER STEERING DEVICE USING THE SAME

BACKGROUND OF THE INVENTION

1. Field of the Invention

The present invention relates to a motor for a power steering device and a power steering device using this motor for reversing the direction of the rotation of the motor and transmitting the reversed rotation to a pinion shaft via an output shaft.

2. Description of Related Art

Recently, as a power steering for a vehicle, an electrically driven power steering device using an electric motor, rather than a hydraulic motor, is used. In the prior art, the torque of a motor is required to be transmitted in the same rotational direction as the rotational direction of the steering wheel of a vehicle, and the armature of a motor is likewise rotated in the same direction as the rotation of the steering wheel as disclosed in Japanese unexamined patent application publication No. H6-316270.

However, this device has a problem in that when the flow of electric current to the motor is required to be switched so as to rotate the motor in the same direction as the rotation of a steering wheel, measures to suppress armature reaction and spark noise generation are required. This is because excessive current flows when the flow of current is switched. Further, a plurality of diodes and transistors for switching the flow direction of current are required.

One way of dealing with such problem is disclosed in Japanese unexamined patent application publication No. H7-61362, which shows a movable body that is straight spline-coupled to either one of a stub axle or a pinion shaft and helical spline-coupled to the other stub axle or the shaft; and a first or second clutch mechanism that is operated by the movable body moved by the rotation of the stub axle. The unidirectional rotation of a motor is reversed by a driving bevel gear and a pair of driven bevel gears, and is transmitted to the pinion shaft.

However, this device has a problem in that the life and the precision of a torsion bar are easily deteriorated. The reasons for such deterioration are (1) torque for moving the movable body via the helical spline coupling carried out by twisting the torsion bar provided between the stub axle and the pinion shaft through the rotation of the motor, is not required to be reversed; and (2) transmitting the rotation of the motor is directly applied to the torsion bar via the helical spline coupling.

SUMMARY OF THE INVENTION

It is therefore an object of the present invention to provide a motor wherein the rotation direction of an output shaft can be switched without switching the flow direction of the current of the motor so as to realize durability in a power steering motor and a power steering device.

According to the present invention, a switching mechanism is provided between an armature shaft and an output shaft for reducing the rotational speed of the armature shaft and rotating the output shaft in two reverse directions. Thus, the flow of current to an armature coil is not required to be switched so as to switch the rotation of the output shaft. Thus, conventionally required measures to suppress armature reaction and spark noise generation are not required, and torque is prevented from being directly applied to a torsion bar, thereby enhancing the durability of a power steering device.

Preferably, the switching mechanism switches the rotation of the output shaft based upon torque in the rotational direction operating upon the output shaft or the angle of rotation so that the input of a signal for switching the rotational direction can be simplified.

Preferably, a reduction gear mechanism having a planetary gear shaft for supporting two planetary gears are provided, and the output shaft is arranged in a central position around which revolving shafts of the planetary gears revolves.

Preferably, the switching mechanism is constructed to have one speed reduction ratio in which rotation in the same direction as the rotation of an armature shaft is transmitted to the output shaft, and the other reduction gear ratio in which rotation in the direction reverse to the rotation of the armature shaft is transmitted to the output shaft. The reduction ratios may be different from each other in a predetermined range so that a load upon a driver can be also reduced by changing the degree of assistance in the clockwise or counterclockwise rotational direction of a steering wheel in accordance with a road condition or a running condition such as turning to the right and turning to the left when torque is transmitted to the steering wheel. Alternatively, the ratios may be the same in both so that equal torque can be transmitted to a steering device in the clockwise or counterclockwise rotation of the steering wheel.

Preferably, rotation transmission between the armature shaft and the output shaft is interrupted at a predetermined steering position so that delay in the return of the output shaft caused by the inertia of the armature can be eliminated and the steering device can be promptly returned.

Preferably, the switching mechanism has a speed reduction mechanism including an internal gear and an external gear, and a regulating member is provided for regulating either the rotation of the internal gear or that of the external gear so that the rotational direction transmitted from the armature shaft to the output shaft can be readily changed.

BRIEF DESCRIPTION OF THE DRAWINGS

Other objects, features and advantages of the present invention will be made more apparent from the following detailed description in conjunction with the accompanying drawings, in which.

DETAILED DESCRIPTION OF PRESENTLY PREFERRED EMBODIMENTS

First Embodiment

Figure 1:
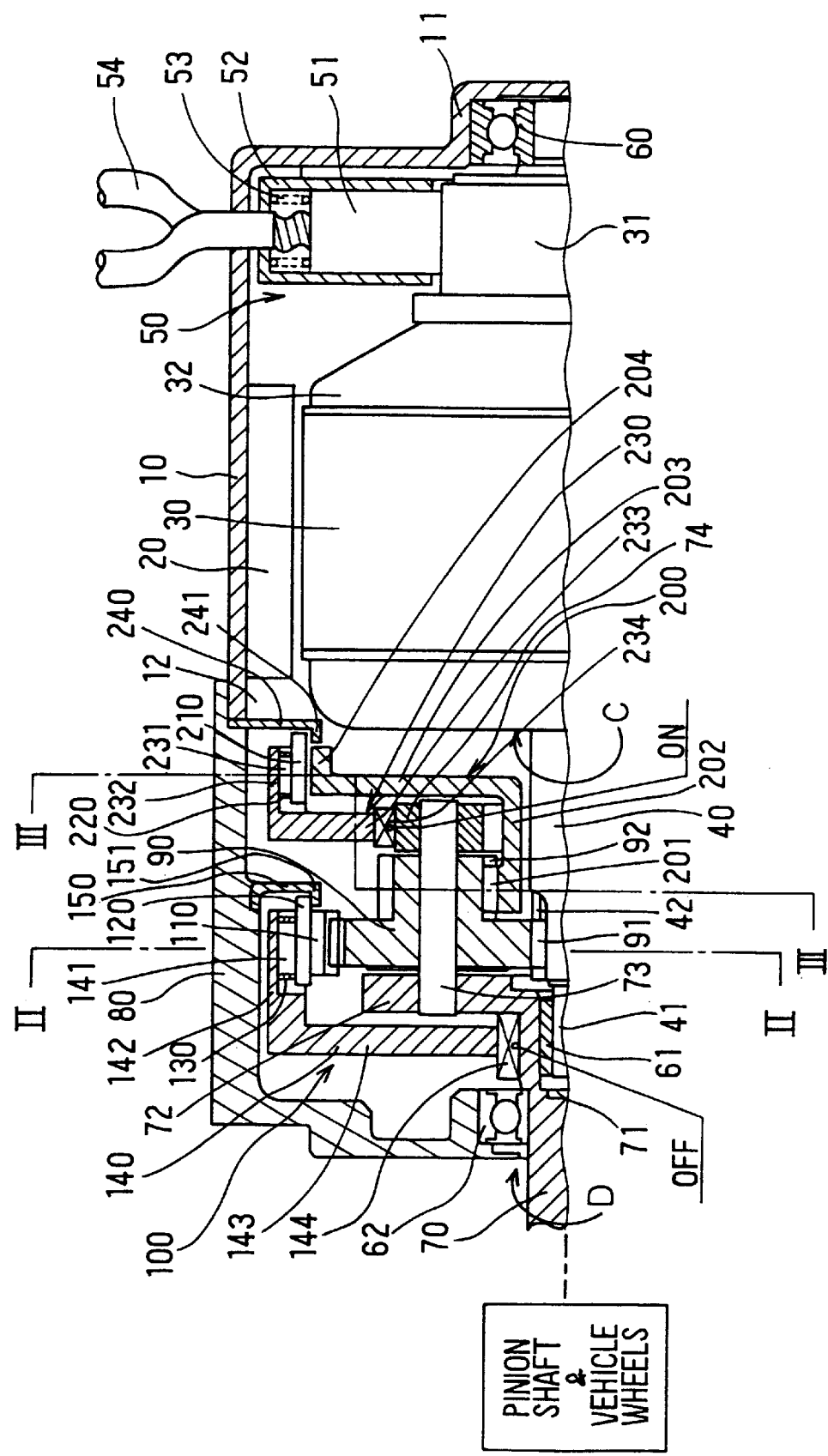
FIG. 1 is a sectional view showing a motor according to a first embodiment of the present invention.

A first embodiment of the present invention in which a motor is applied to an electrically driven power steering device will be described in detail below with reference to FIGS. 1 to 6.

A motor comprises: a cylindrical yoke 10; a plurality of magnets 20 forming a stator fixed on the inner face of this yoke 10; an armature 30 provided inside these magnets 20, provided with a commutator 31 at one axial end and on which an armature coil is wound; an armature shaft 40 for rotatably supporting this armature 30; and a brush mechanism 50 for supplying current to the commutator 31 of the armature 30. This brush mechanism 50 is constituted by a brush 51 which is in contact with the commutator 31, a brush holder 52 for holding this brush 51, a brush spring 53 for pressing radially inward the brush 51 on the side of the commutator 31 and a power supply line 54 for supplying electric current to the brush 51.

One axial end of the armature shaft 40 is supported by a bearing 60 housed in a bearing holder 11 provided on the side of the yoke 10 so that the armature shaft 40 can be rotated and a portion 41 with a smaller diameter than that of the armature shaft 40 is formed at the other end of the armature shaft 40.

An output shaft 70 is coupled with a steering shaft not shown so that the torque of this output shaft 70 assists that of a steering wheel through a pinion shaft in the known manner, such as described in, for example Japanese unexamined patent application publication No. H3-7661. This output shaft 70 is arranged on the same axis as the armature shaft 40, and the smaller diameter portion 41 of the armature shaft 40 is housed in a concave portion 71 formed at one axial end of this output shaft 70 via a bearing 61 so as to support the other end of the armature shaft 40 so that the armature shaft can be rotated. A disc part 72 extended in the direction of the diameter of the output shaft is formed at one end of the output shaft 70.

A housing 80 covers the open end 12 of the yoke 10 and supports the output shaft 70 by a bearing 62 so that the output shaft 70 can rotate.

Planetary gears 90 are held along the periphery of a plurality of pins 73 planetary shafts) fixed on the periphery of the disc part 72 of the output shaft 70 at an equal angular interval so that each planetary gear 90 can be rotated therearound, and a first gear 91 (a first planetary gear) formed in a part with a large diameter and a second gear 92 (a second planetary gear) formed in a part with a small diameter are formed. The first gear 91 of the planetary gear 90 is engaged with a sun gear 42 (a first sun gear) formed on the periphery of the armature shaft 40.

An internal gear mechanism 100 is constituted by a circular internal gear 110 the inner face of which is engaged with the first gear 91 of the planetary gear 90; a first cylindrical contact member 120 which is in contact with the periphery of this internal gear 110; a first spring 130 for pressing the contact member 120 radially inward on the periphery of the internal gear 110 and a first bracket 140.

A first bracket 140 is constituted by a cylindrical part 142 provided with a housing 141 for housing a first spring 130, and a disc part 143 extended from one end of this cylindrical part 142 to the output shaft 70. Between the end face of this disc part 143 and the output shaft 70, there is provided a first electrically-controlled ON/OFF type coupling/releasing member 144 for coupling or releasing the end face of the disc part 143 to/from the output shaft 70. A first supporting member 150 is fixed on the inner face of the housing 80 and a bent part 151 which is in contact with one end of the contact member 120 is formed at the end thereof.

A rotation supporter 200 is constituted by a cylindrical part 202, a disk part 203, and a flange part 204. On the periphery of the cylindrical part 202 a gear 201 (a second sun gear) which engaged with the second gear 92 of the planetary gear 90 is formed. The cylindrical part 202 extends along the armature shaft 40. The disc part 203 extends from one end of this cylindrical part 202 to the direction of the diameter of the cylindrical part. The flange part 204 extends from the periphery of the disc part 203 to the side of the armature 30.

The periphery of the flange part 204 of the rotation supporter 200 is in contact witha second cylindrical contact member 210. A second spring 220 presses the second contact member 210 onto the periphery of the flange part 204 of the rotation supporter 200.

Further, a second bracket 230 and a circular portion 74 are provided. The circular portion 74 is provided at an equal angular interval at one end of the plurality of pins 73 fixed on the periphery of the disc part 72 of the output shaft 70. This second bracket 230 is constituted by a cylindrical part 232 provided with a housing 231 for housing the second spring 220 and a disc part 233 extended from one end of the cylindrical part 232 to the circular portion 74. Between the end face of this disc part 233 and the circular portion 74, there is provided a second electrically controlled ON/OFF type coupling/releasing member 234 for coupling or releasing the end face of this disc part 233 to/from the pin 73.

A supporting member 240 is fixed between the housing 80 and the yoke 10, and a bent part 241 which is in contact with one end of the second contact member 210 is formed at the end thereof.

Next, operation of this motor will be described referring to FIGS. 1 to 3 when the direction of rotation of the armature shaft 40 and that of the output shaft 70 are the same.

First, when the output shaft 70 is rotated by steering in the direction shown by an arrow D in FIG. 1, the end face of the disc part 143 of the first bracket 140 and the output shaft 70 are released by turning OFF the first coupling/releasing member 144 so that the rotation of the output shaft 70 is not transmitted to the first bracket 140.

Figure 2:
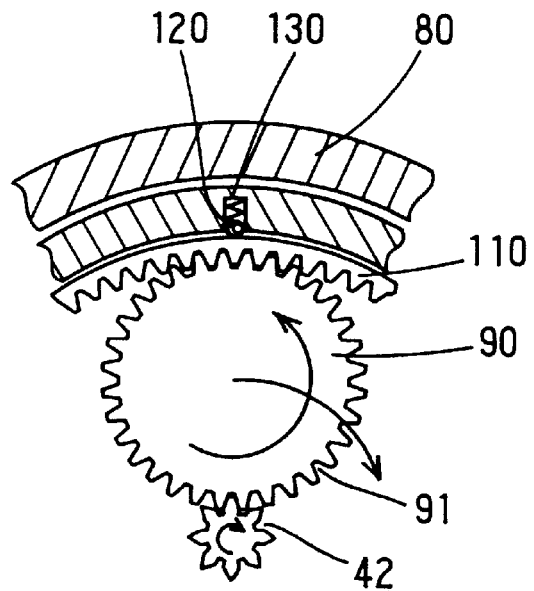
FIG. 2 is a sectional view showing a part of the motor viewed along a line II—II in FIG. 1.

As shown in FIG. 2, one end of the first contact member 120 is pressed on the bent part 151 of the first supporting member 150 with the first contact member 120 pressed on the periphery of the internal gear 110 by the first spring 130 (see FIG. 1). Thus, the rotation of the internal gear 110 is regulated relative to the housing 80.

Further, as the end face of the disc part 233 of the second bracket 230 and the circular portion 74 are coupled by the second coupling/releasing member 234, the second bracket 230 is supported by the periphery of the circular portion 74. Thus, as shown in FIG. 3, as the second contact member 210 is positioned inside the housing 231 of the cylindrical part 232 of the second bracket 230 by the effect of centrifugal force against the second spring 220, clearance is provided between the second contact member 210 and the flange part 204 of the rotation supporter 200. As the end face of the disc part 233 of the second bracket 230 and the pin 73 are coupled by turning ON the second coupling/releasing member 234 at this time, the second bracket 230 is supported by the periphery of the pin 73.

When the armature 30 is rotated in the direction shown by an arrow C in FIG. 1 in this state, this rotation is transmitted to the first gear 91 of the planetary gear 90 via the armature shaft 40 and the sun gear 42. As the rotation of the rotation supporter 200 is not regulated relative to the housing 80 and the rotation of the internal gear 110 is regulated relative to the housing 80 (because the clearance is provided between the second contact member 210 and the flange part 204 of the rotation supporter 200), the planetary gear 90 rotates on its own axis along the periphery of the pin 73, and the armature shaft 40 rotates clockwise as shown in FIG. 2. As a result, the rotational speed of the armature shaft 40 is reduced and the output shaft 70 can be rotated in the same direction as the armature shaft 40 as shown by an arrow D. Thus, vehicle steering is assisted by the rotation of the output shaft 70.

Next, reverse operation of motor will be described referring to FIGS. 4 to 6 in the case when the rotational direction of the armature shaft 40 and the output shaft 70 are opposite.

Figure 3:
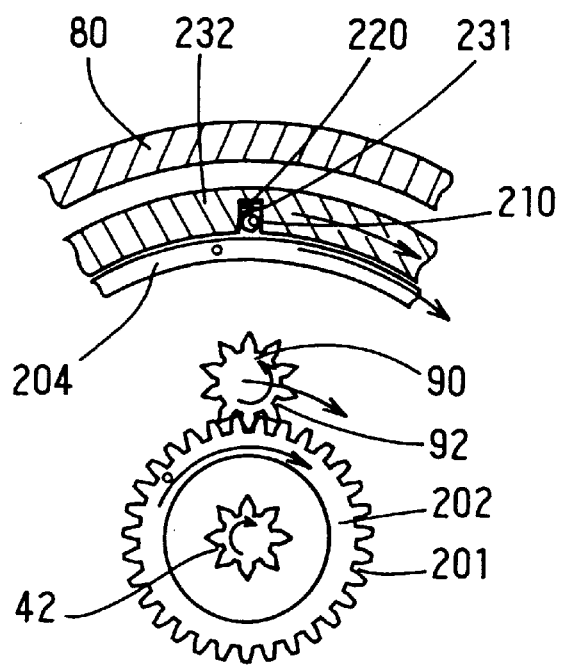
FIG. 3 is a sectional view showing a part of the motor viewed along a line III—III in FIG. 1.

First, the disc part 143 of the first bracket 140 and the output shaft 70 are coupled by turning ON the first coupling/releasing member 144, as the output shaft 70 is rotated by a steering device in the direction shown by an arrow D' in FIG. 3. At this stage, the first bracket 140 is supported by the output shaft 70.

Figure 4:
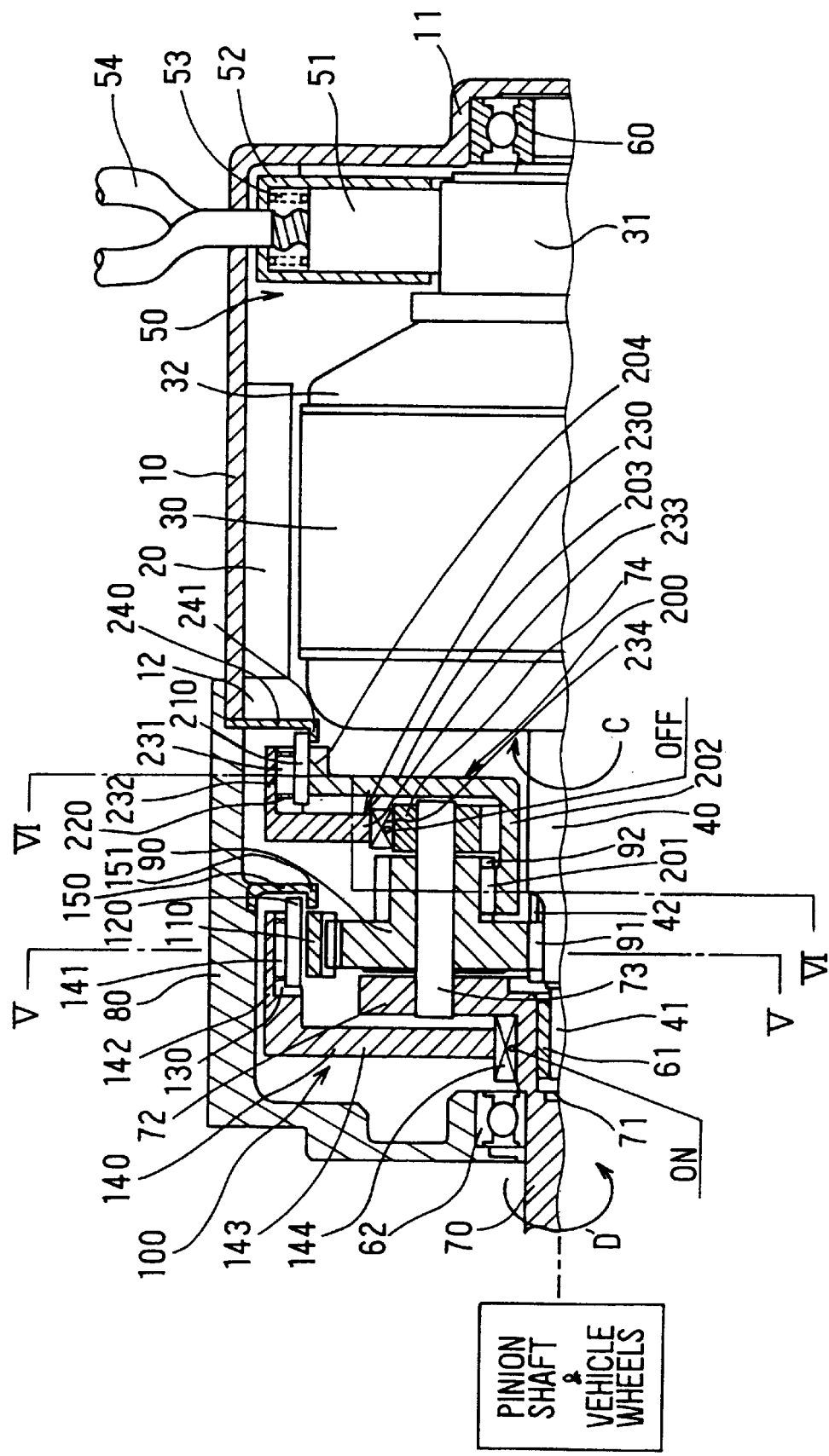
FIG. 4 is a sectional view showing a motor in its one operational mode according to the first embodiment.

As shown in FIG. 4, as the first contact member 120 is positioned inside the housing 141 against the first spring 130, clearance is provided between the first contact member 120 and the internal gear 110. Clearance is also provided between one end of the first contact member 120 and the bent part 151 of the supporting member 150. Thus, the rotation of the internal gear 110 is not regulated relative to the housing 80.

At this time, the end face of the disc part 233 of the second bracket 230 and the circular portion 74 are released by turning OFF the second coupling/releasing member 234 and the rotation of the circular portion 74 is not transmitted to the second bracket 230.

Figure 6:
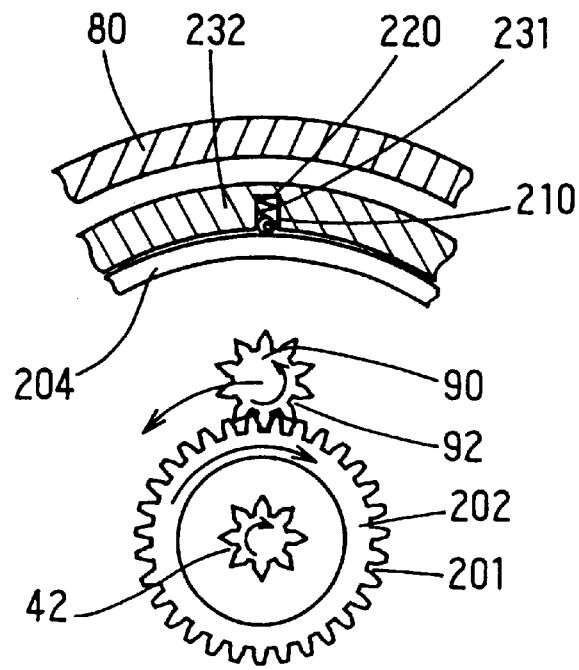
FIG. 6 is a sectional view showing a part of the motor viewed along a line VI—VI shown in FIG. 4.

Further, as shown in FIG. 6, the second contact member 210 is pressed radially on the flange part 204 of the rotation supporter 200 by the second spring 220. One end of the second contact member 210 comes in contact with the bent part 241 of the second supporting member 240. Thus, the rotation of the rotation supporter 200 is regulated relative to the housing 80.

When the armature 30 is rotated in the direction shown by an arrow C in FIG. 4 in this state, the rotation is transmitted to the first gear 91 of the planetary gear 90 via the armature shaft 40 and the sun gear 42. As the rotation of the rotation supporter 200 is regulated relative to the housing 80 by the second contact member 210 (in the meantime, the rotation of the internal gear 110 is not regulated relative to the housing 80), the planetary gear 90 is rotated on its own axis along the periphery of the pin 73 in the direction reverse to the rotational direction C of the armature shaft 40 along the periphery of the armature shaft 40 as shown in FIG. 6. Therefore, the output shaft can be rotated in the direction (clockwise) reverse to the rotational direction of the armature shaft 40.

Therefore, since the rotational direction of the output shaft 70 is switched or reversed when the first and second coupling/releasing members 144 and 234 sense the change of the rotational direction of a steering wheel as described above, the flow of current to the armature coil of a motor is not required to be switched. Thus, armature reaction and spark noise generation are suppressed.

The torque of the output shaft can be surely transmitted to a steering wheel without a delay in the reaction of the armature of a motor to the torque of the output shaft 70 being transmitted to the steering wheel.

Further, the reduction gear ratio when the rotation in the same direction as the armature shaft 40 is transmitted to the output shaft 70 and the reduction gear ratio when the rotation in the direction reverse to the rotational direction of the armature shaft 40 is transmitted to the output shaft 70 are set substantially same as the gear ratio of the sun gear 42 to the planetary gear 90. Thus, the torque received from the output shaft 70 can be substantially fixed and can be transmitted to a steering wheel equally clockwise and counterclockwise.

The rotational direction of the output shaft 70 may be switched based upon the change of the torque operating upon the output shaft 70. Thus, the input of a signal for switching the rotational direction is unnecessary.

The torque received from the output shaft 70 can be variably set by differentiating the reduction gear ratio when the rotation in the same direction as the armature shaft is transmitted to the output shaft 70 and the reduction gear ratio when rotation in the direction reverse to the rotational direction of the armature shaft 40 is transmitted to the output shaft 70 in a predetermined range. For example, when torque is transmitted to a steering wheel, the load of a driver can be also reduced by changing the degree of assistance in the clockwise or counterclockwise rotational direction of the steering wheel in view of the road conditions and running conditions such as turning to the left or to the right.

Further, delay in return to a neutral position caused by the inertia of the armature, generated in the output shaft 70 by an epicyclic reduction gear, can be eliminated by preventing the transmission of rotation between the armature shaft 40 and the output shaft 70 when a steering gear is in neutral. Thus, the steering gear can be returned promptly to a neutral position. A method of interrupting the transmission of rotation will be described below.

Figure 5:
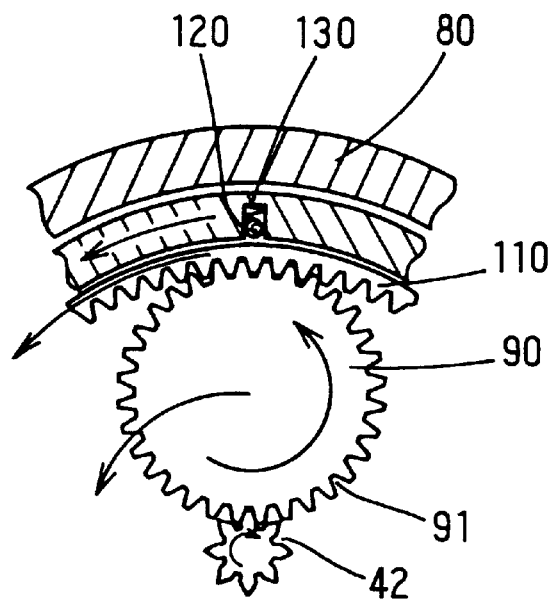
FIG. 5 is a sectional view showing a part of the motor viewed along a line V—V in FIG. 4.

First, as shown in FIGS. 4 and 5, when the first contact member 120 is positioned inside the housing 141 (formed by the cylindrical part 142 of the first bracket 140) against the first spring 130, clearance is provided between the first contact member 120 and the internal gear 110. Clearance is also provided between one end of the first contact member 120 and the bent part 151 of the first supporting member 150. Thus, the rotation of the internal gear 110 is not regulated relative to the housing 80.

At that time, as shown in FIG. 3, when the second contact member 210 is positioned inside the housing (formed by the cylindrical part 232 of the second bracket 230) against the second spring 220, clearance is provided between the second contact member 210 and the flange part 204 of the second bracket 230.

Therefore, the rotation of the planetary gear 90 is not regulated by the internal gear 110 and the rotation supporter 200. Further, the rotation from the output shaft 70 only idles the planetary gear 90 along the periphery of the pin 73, rotation to the armature shaft 40 is not transmitted and the inertia of the armature generated in the output shaft 70 can be eliminated.

Further, a rotational direction may be also switched not by a signal of torque, a rotational direction, a rotational angle, or the like from the output shaft 70, but by a signal from a torque sensor or the like provided on a steering shaft and thus, more timely and finer control is enabled.

Second Embodiment

Next, referring to FIGS. 7 to 12, a second embodiment of a steering gear according to the present invention will be described.

A motor 300 has substantially the same constitution as the motor described in the first embodiment. It comprises a cylindrical yoke 310; a plurality of field cores 321 and a stator coil 322 wound on the field core 321, constituting a stator 320 fixed on the inner face of this yoke 310 by a screw 311; an armature 330 provided inside the stator 320 and provided with a commutator 332 at one axial end thereof on which an armature coil 331 is wound; an armature shaft 340 for supporting the armature 330; and a brush mechanism 350 for supplying current to the commutator 332 of the armature 330. This brush mechanism 350 is constituted by a brush 351 which is in contact with the commutator 332, a brush holder 352 for holding this brush 351 and a brush spring 353 for pressing the brush 351 radially outwardly on the side of the commutator 332.

One end of the armature shaft 340 is supported by a bearing 361 housed in a rear frame 360 coupled to one end of the yoke 310 using a faucet joint so that the armature shaft 340 can be rotated. The brush holder 352 is held between the rear frame 360 and the yoke 310.

A sun gear 341 is formed at the other end of the armature shaft 340. The other end of the armature shaft 340 is supported by a bearing 371 housed in a front frame 370 coupled to the other end of the yoke 310 using a faucet joint so that the armature shaft 340 can be rotated. Further, the yoke 310 is held between the front frame 370 and the rear frame 360 and fixed firmly by a through bolt 380.

Next, a rotation reversing mechanism 400 for transmitting the rotation by reversing the unidirectional rotation of the motor 300 to a pinion shaft 610 will be described.

Figure 11:
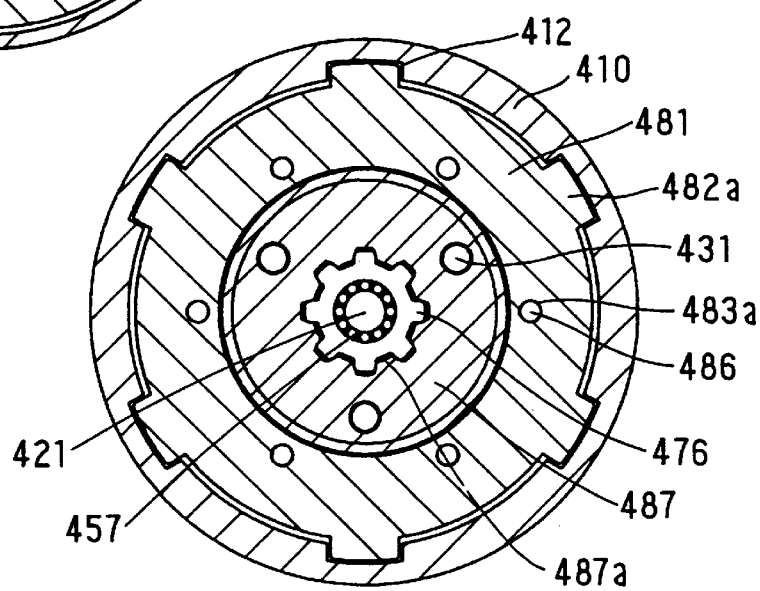
FIG. 11 is a sectional view viewed along a line XI—XI in FIG. 8.
Figure 12:
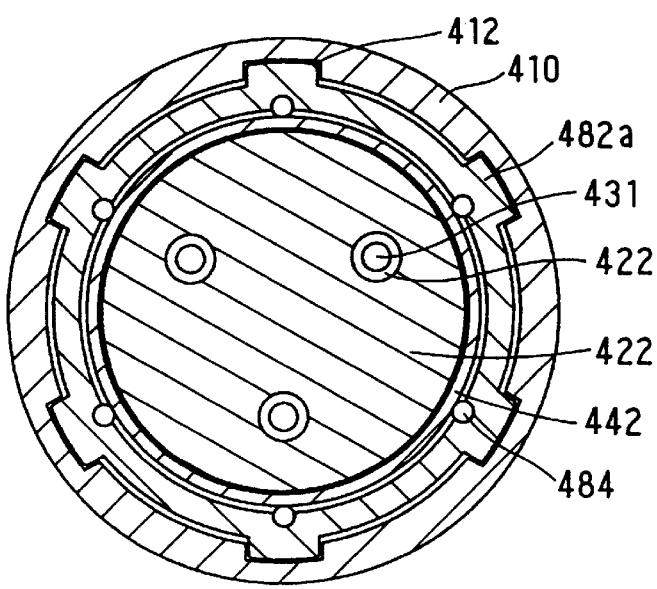
FIG. 12 is a sectional view viewed along a line XII—XII in FIG. 8.

As shown in FIGS. 11 and 12, a portion different in level 411 is respectively formed on the inner face at both ends of a cylindrical case 410 and six concave portions 412 are formed at an equal angular interval along the periphery thereof on the central inner face thereof.

One end 421 of an output shaft 420 provided in the center of the case 410 is supported by a bearing 343 in the concave portion 342 formed at the other end of the armature shaft 340 so that the output shaft can be rotated. The output shaft 420 is arranged on the same axis as the armature shaft 340. A disc projection 422 integrated with the output shaft 420 is formed at one end 421 of the output shaft 420.

A planetary gear 430 has its inside engaged with the sun gear 341 of the armature shaft 340 and has its periphery engaged with an internal gear formed on the inner face of a first rotator 440. A cylindrical part 442, extended on the side opposite to the side of the internal gear 441 (on the peripheral side of which a conic slope 443 is formed), and a flange part 444, extended on the peripheral side in the direction of the diameter thereof, are integrated in the first rotator 440. The end of the flange part 444 is housed in the portion different in level 411 at one end of the case 410. A plate 445 and a roller bearing 446 are housed in space formed among the portion different in level 411 of the case 410, the flange part 444 of the first rotator 440, and the front frame 370. The first rotator 440 is supported by the roller bearing 446 so that the first rotator can be rotated.

The planetary gear 430 is attached to one end of a supporting pin 431 and a gear 432 is formed at the other end thereof. This supporting pin 431 is supported by the disc projection 422 of the output shaft 420 via the bearing 433 so that the supporting pin can be rotated. Three supporting pins 433 are provided at an equal interval along the periphery of the output shaft, as shown in FIGS. 10 to 12, and respectively support three planetary gears 430 so that any planetary gear can be rotated.

An external gear 451 engaged with the inside of the gear 432 in the direction of the diameter thereof (formed at the other end of the supporting pin 431) is formed inside a second rotator 450. A cylindrical part 452, which is extended on the side of the cylindrical part 442 of the first rotator 440 and on the peripheral side of which a conic slope 453 is formed, and a flange part 454, extended on the peripheral side in the direction of the diameter thereof, are integrated on the peripheral side of the second rotator 450. The end of this flange part 454 is housed in the portion different in level 411 at the other end of the case 410, and a plate 455 and a roller bearing 456 are housed in space formed among the portion different in level 411 of the case 410, the flange part 454 of the second rotator 450, and a bracket 460. The second rotator 450 is supported by this roller bearing 456 and a bearing 457 so that the second rotator can be rotated as the first rotator 440.

Figure 10:
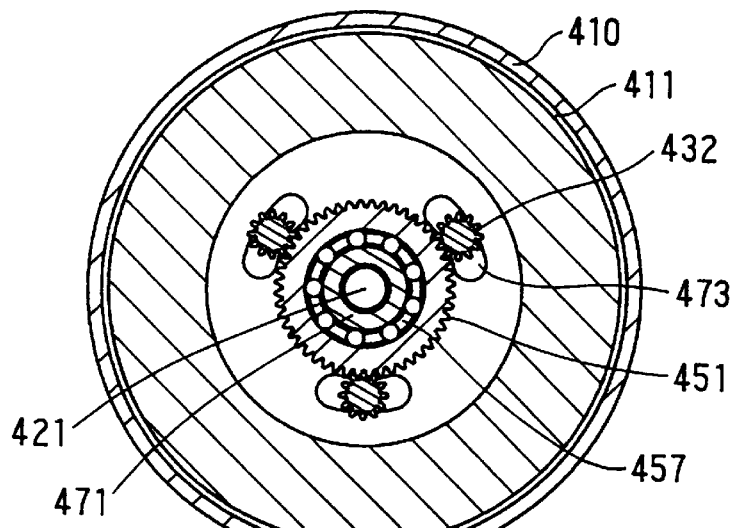
FIG. 10 is a sectional view viewed along a line X—X in FIG. 8.

A rotation transmitting mechanism 470 comprises: a first cylindrical part 471, extended axially along the output shaft 420 with a predetermined gap between the first cylindrical part and the output shaft; a disc part 472 extended from the first cylindrical part 471 to the cylindrical part 452 of the second rotator 450; and a longitudinal hole 473 through which the supporting pin 431 passes as shown in FIG. 10 is formed through this disc part 472. A second cylindrical part 474, which is extended from the disc part 472 to the disc projection 422 of the output shaft 420, is formed on the inner face of which a difference in level 475. On the periphery of the second cylindrical part 474 a helical spline 476 is integrally formed. A bearing 477 is provided in the difference in level 475 of the second cylindrical part 474, and the rotation transmitting mechanism 470 is supported so that the mechanism can be rotated independent of the output shaft 420.

A regulating mechanism 480 comprises a regulating member 481 provided in the case 410 having a circular part 482 extended axially and a protruded part 483 extended from this circular part 482 to the inside. A projection 482a fitted into the concave portion 412 of the case 410 is formed on the periphery of the circular part 482. The regulating member 481 can be moved axially without being rotated between the concave portion 412 of the case 410 and the projection 482a. First and second housings 482b and 482c for housing a first ball 484 and a second ball 485, respectively, are formed in positions opposite to the slope 443 of the cylindrical part 442 of the first rotator 440 and the slope 453 of the cylindrical part 452 of the second rotator 450, respectively, inside the circular part 482. Further, a through hole 483a extended axially is formed through the protruded part 483 of the regulating member 481 and a third ball 486 is housed in this through hole 483a.

A moving member 487 is provided with a spline 487a fitted to the helical spline 476 of the second cylindrical part 474 of the rotation transmitting mechanism 470 and is fixed to the supporting pin 431. A housing 487b for housing the protruded part 483 of the regulating member 481 and the third ball 486 is formed outside this moving member 487.

A coupling member 500 transmits the rotation of a stub axle 620 to the rotation reversing mechanism 400 and also transmits the rotation of the motor 300 to the pinion shaft 610. This coupling member 500 comprises: a housing 510; a first bevel gear 520 supported in this housing 510 via a first bearing 511 so that the first bevel gear can be rotated; and a second bevel gear 530 supported via a second bearing 512 so that the second bevel gear can be rotated. The other end 423 of the output shaft 420 is press-fitted into the concave portion 521 of the first bevel gear 520.

A first gear 540 is fixed on the periphery of the rotation transmitting mechanism 470 on the side of the first bevel gear 520. Further, a second gear 550 engaged with the first gear 540 is fixed in the concave portion 531 of the second bevel gear 530.

A steering shaft mechanism 600 comprises: the pinion shaft 610 coupled to vehicle wheels not shown; the stub axle 620 coupled to a steering wheel not shown; and a torsion bar 630 inserted into the concave portion 611 of the pinion shaft 610 and into the concave portion 621 of the stub axle 620. Both ends of this torsion bar 630 are respectively fixed on the pinion shaft 610 and stub axle 620 by pins 612 and 622. The pinion shaft 610 and the stub axle 620 are supported by a bearing 640 so that they can be rotated relatively.

A first disc gear 650 engaged with the first bevel gear 520 of the coupling member 500 is provided on the periphery of the pinion shaft 610 so that the rotation of the motor 300 is transmitted to the pinion shaft 610. A second disc gear 660 engaged with the first bevel gear 520 of the coupling member 500 is provided on the periphery of the stub axle 620 so that the rotation of the stub axle 620 is transmitted to the second gear 550 via the second bevel gear 530.

A case 670 supports the stub axle 620 via a ball bearing 680 so that the stub axle can be rotated and houses the first and second disc gears 650 and 660 inside. The housing 510 of the coupling member 500 is fixed to this case 670.

Next, the operation of the power steering will be described next when the stub axle 620 in the steering shaft mechanism 600 is rotated in the direction shown by an arrow X in FIG. 7 by a driver.

First, the torsion bar 630 is twisted to rotate the stub axle 620, and the stub axle starts to rotate relative to the pinion shaft 610. The second disc gear 660 starts to rotate in the same direction as the stub axle 620 by this rotation, and the second bevel gear 530 is rotated in the direction shown by an arrow Y. The rotation transmitting mechanism 470 of the rotation reversing mechanism 400 is rotated via the second gear 550 and the first gear 540 by the rotation of this second bevel gear 530.

Figure 8:
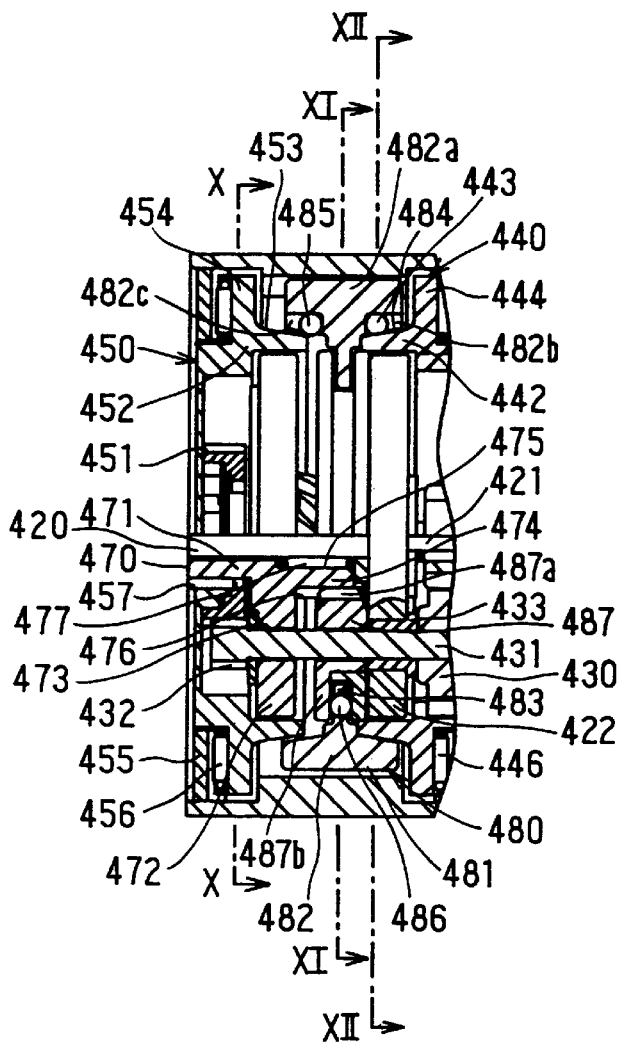
FIG. 8 is an enlarged sectional view showing a main part of the power steering-device in its one operational state.

The helical spline 476 of the second cylindrical part 474 is rotated by the rotation of the rotation transmitting mechanism 470. The moving member 487 the spline 587a of which is coupled to this helical spline 476 is moved turning along the spline to the side of the motor 300. The regulating member 481 housed in the housing 487b of this moving member 487 is also moved axially by the movement of the moving member 487. The first ball 484 housed in the first housing 482b of the circular part 482 of the regulating member 481 comes in contact with and presses upon the slope 443 of the cylindrical part 442 of the first rotator 440. As a result, the rotation of the first rotator 440 is regulated. This is because the rotation of the regulating member 481 is regulated as the projection 482a of this regulating member 481 is fitted into the concave portion 412 of the case 410. FIG. 8 illustrates when the rotation of the first rotator 440 is regulated.

The rotation of the first rotator 440 is regulated, while the rotation of the second rotator 450 is not regulated because the regulating member 481 is moved to the side of the first rotator 440 and the second rotator 450 can be rotated owing to the roller bearing 456 and the bearing 457.

An electric switch not shown is turned on by the axial movement of the moving member 487 to turn on the motor 300, and the armature shaft 340 is rotated in the direction shown by an arrow Z. The rotation of this armature shaft 340 is transmitted to the planetary gear 430 via the sun gear 341. At this time, as the rotation of the first rotator 440 is regulated by the regulating member 481 as described above, the rotational speed of the armature shaft 340 is reduced in predetermined reduction gear ratio determined by the sun gear 341 and the internal gear 441 by the revolution of the planetary gear 430. Also rotation in the same direction as the rotation of the armature shaft 340 is transmitted to the output shaft 420 via the supporting pin 431. The second rotator 450 provided with the external gear 451 engaged with the gear 432 formed at the other end of the supporting pin 431 is only rotated without being regulated.

Therefore, the rotation of the output shaft 420 is transmitted to the first bevel gear 520 and rotation in the same direction as the rotation of the stub axle 620 is transmitted to the pinion shaft 610 via the first disc gear 650. Thus, the rotational speed of the motor 300 is reduced and transmitted to the pinion shaft 610, and as a result, a wheel can be readily moved.

Figure 7:
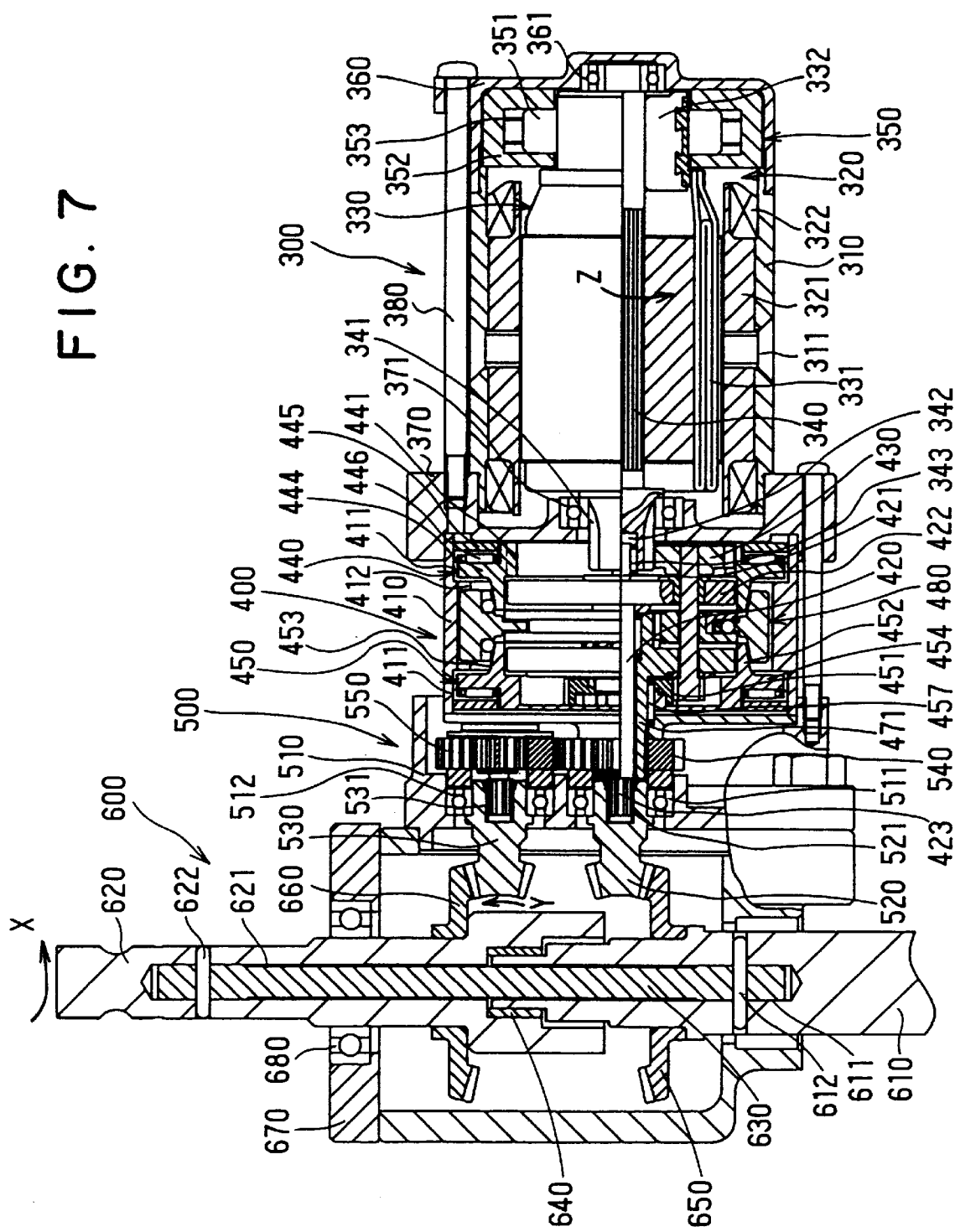
FIG. 7 is a sectional view showing a power steering device according to a second embodiment of the present invention.

In the meantime, when the stub axle 620 of the steering shaft mechanism 600 is rotated in the direction reverse to the direction shown by the arrow X in FIG. 7, the torsion bar 630 is twisted to rotate the stub axle 620. The stub axle 620 starts to be rotated relative to the pinion shaft 610, the second disc gear 660 starts to be rotated in the same direction as the rotation of the stub axle 620 and the second bevel gear 530 is rotated in the direction reverse to the direction shown by the arrow Y. The rotation transmitting mechanism 470 of the rotation reversing mechanism 400 is rotated in the reverse direction via the second gear 550 and the first gear 540 by the rotation of this second bevel gear 530.

Figure 9:
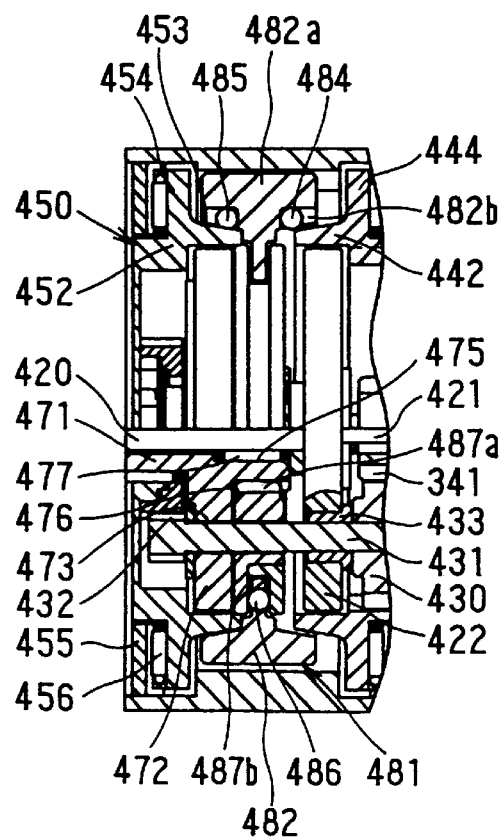
FIG. 9 is an enlarged sectional view showing the main part of the power steering device in its other operational state.

The helical spline 476 of the second cylindrical part 474 is rotated by the rotation in the reverse direction of the rotation transmitting mechanism 470 and the moving member 487 the spline 487a of which is coupled to this helical spline 476 is moved along the spline turning not on the side of the motor 300 but on the side of the second rotator 450. The regulating member 481 housed in the housing 487b of this moving member 487 is also moved axially by the movement of the moving member 487. The second ball 485 housed in the second housing 482c of the circular part 482 of the regulating member 481 comes in contact with the slope 453 of the cylindrical part 452 of the second rotator 450 and presses upon it. As a result, the rotation of the second rotator 450 is regulated. This is because the rotation of the regulating member 481 is regulated as the projection 482a of this regulating member 481 is fitted into the concave portion 412 of the case 410. FIG. 9 shows a state in which the rotation of the second rotator 450 is regulated.

The rotation of the second rotator 450 is regulated, while the rotation of the first rotator 440 is not regulated because the regulating member 481 is moved to the side of the second rotator 450 and the first rotator 440 can be rotated by the roller bearing 446 and the bearing 447.

The electric switch not shown is turned on by the axial movement of the moving member 487 to turn on the motor 300 and the armature shaft 340 is rotated in the direction shown by the arrow Z (in FIG. 7) as described above. This rotation of the armature shaft 340 is transmitted to the planetary gear 340 via the sun gear 341. At this time, as the rotation of the first rotator 440 is not regulated by the regulating member 481 as described above, the first rotator only is rotated, however, as the rotation of the second rotator 450 is regulated. The supporting pin 431 provided with the gear 432 engaged with the external gear 451 of the second rotator 450 is rotated in the direction reverse to the rotational direction of the armature shaft 340. Therefore, the rotational speed of the supporting pin is reduced in predetermined reduction gear ratio determined by the external gear 451 and the gear 432 of the second rotator 450. Also, rotation in the direction reverse to the rotational direction of the armature shaft 340 is transmitted to the output shaft 420 via the supporting pin 431.

Predetermined reduction gear ratio determined by the external gear 451 of the second rotator 450 and the gear 432, and predetermined reduction gear ratio determined by the sun gear 341 and the internal gear 441 of the first rotator 440, are set to the same value. Therefore, this rotation is transmitted to the first bevel gear 520 by the rotation of the output shaft 420 and rotation in the same direction as the rotation of the stub axle 620 is transmitted to the pinion shaft 610 via the first disc gear 650. Thus, the rotational speed of the motor 300 is reduced, the reduced rotational speed is transmitted to the pinion shaft 610 and a wheel can be readily moved.

When a steering is in a neutral state, rotation is not transmitted to the rotation transmitting mechanism 470. Therefore, the regulating member 481 does not move and the motor 300 is not turned on. The first and second rotators 440 and 450 can be rotated without the rotation being regulated because the regulating member 481 is not moved.

Therefore, as the rotational direction of the output shaft 420 is switched by sensing the change of the rotational direction of a steering wheel (the rotational direction of the stub axle 620) by the movement of the regulating member 480 (by the rotation of the rotation transmitting mechanism 470 as described above), the flow of current to the armature coil 331 of the motor 330 is not required to be switched and the armature reaction and the spark noise generation are suppressed. When the torque of the output shaft 420 is transmitted to a steering side, it can be surely transmitted to the steering wheel without causing the delay in response by the armature reaction of the motor.

The torque received from the output shaft 420 can be variably set by differentiating predetermined reduction gear ratio determined by the external gear 451 of the second rotator 450 and the gear 432 and differentiating predetermined reduction gear ratio determined-by the sun gear 341 and the internal gear 441 of the first rotator 440 in a predetermined range. For example, when torque is transmitted to a steering wheel, the load to a driver can be also reduced by changing the degree of assistance in the clockwise or counterclockwise rotational direction of the steering wheel in view of the road conditions and the running conditions, such as turning to the left or to the right.

Further, as the rotation of the first and second rotators 440 and 450 are not regulated when the steering device is in a neutral state, delay in return to the neutral position caused by the inertia of the armature generated in the output shaft 420 by a reduction gear can be eliminated by preventing the transmission of rotation between the armature shaft 340 and the output shaft 420 when a steering device is in neutral, and the steering can be returned promptly to a neutral position.

The motor 300 may be also turned on not by the movement of the regulating member 481 but by a signal from a torque sensor or the like provided on a steering shaft or the like.

The gear 432 may be mounted on the supporting pin 431 rotatably of fixedly.

The present invention having been described should not be limited to the two preferred embodiments but may be modified in various ways without departing from the scope and the spirit of the invention.

What is claimed is:

1. A motor for a power steering device for transmitting rotation to a pinion shaft coupled to vehicle wheels, comprising:

a pinion shaft;
   an armature having an armature core and an armature coil;
   an armature shaft for supporting said armature;
   an output shaft for transmitting a rotation of said armature shaft to said pinion shaft; and
   switching unit provided between said armature shaft and said output shaft,
      said switching unit for rotating said output shaft either in a same direction as or in an opposite direction of a rotational direction of said armature shaft depending on a rotational direction of said pinion shaft,
      and said switching unit for reducing the rotational speed of said armature shaft,
   wherein said switching unit includes a reduction gear mechanism having:
      a first sun gear provided on said armature shaft;
      a plurality of first planetary gears engaged with said first sun gear, said first planetary gears constructed to revolve around said first sun gear;
      an internal gear having internal teeth engaged with said first planetary gears;
      a second planetary gear integrally rotatable on the same axis as said first planetary gears;
      a second sun gear having external teeth engaged with said second planetary gear; and
      planetary gear shafts for supporting said first and said second planetary gears rotatably thereon, and
   wherein said output shaft is provided at a central position around which said planetary gear shafts revolve.

2. A motor for a power steering device according to claim 1, wherein the rotation of said output shaft is switched by said switching unit based upon torque in the rotational direction operating upon said output shaft or the angle of rotation.

3. A motor for a power steering device according to claim 1, wherein said switching unit is constructed to:
   regulate the rotation of said internal gear and enable the rotation of said second sun gear when the rotation to be transmitted to said output shaft is in a same direction as the rotation of said armature shaft; and
   regulate the rotation of said second sun gear and enable the rotation of said internal gear when the rotation to be transmitted to said output shaft is in an opposite direction to the rotation of said armature shaft.

4. A motor for a power steering device according to claim 1, wherein said switching unit has a first reduction gear ratio and a second reduction gear ratio that is substantially same as the first reduction gear ratio, the first reduction gear ratio being for when the rotation to be transmitted is in a same direction as the rotation of said armature shaft and the second reduction gear ratio being for when the rotation to be transmitted is in a direction opposite to the rotation of said armature shaft.

5. A motor for a power steering device according to claim 1, wherein said switching unit is constructed to interrupt transmission of rotation between said armature shaft and said output shaft in a predetermined steering position.

6. A motor for a power steering device for transmitting rotation to a pinion shaft coupled to vehicle wheels, comprising:

a pinion shaft;
   an armature having an armature core and an armature coil;
   an armature shaft for supporting said armature;
   an output shaft for transmitting a rotation of said armature shaft to said pinion shaft; and
   switching unit provided between said armature shaft and said output shaft,
      said switching unit for rotating said output shaft either in a same direction as or in an opposite direction of a rotational direction of said armature shaft depending on a rotational direction of said pinion shaft, said switching unit for reducing the rotational speed of said armature shaft, and said switching unit having a first reduction gear ratio and a second reduction gear ratio that is different from said first reduction gear ratio, wherein the first reduction gear ratio is for when the rotation to be transmitted is in a same direction as the rotation of said armature shaft and the second reduction gear ratio is for when the rotation to be transmitted is in a direction opposite to the rotation of said armature shaft.

7. A power steering device comprising;

a stub axle coupled to a steering wheel;

a pinion shaft coupled to vehicle wheels;

a torsion bar connecting said stub axle and said pinion shaft;

a motor provided with an armature with an armature core and an armature coil and with an armature shaft;

an output shaft for transmitting a rotation of the armature shaft of said motor to said pinion shift; and switching unit provided between said armature shaft and said output shaft, said switching unit for detecting relative rotation between said stub axle and said pinion shaft, and said switching unit for rotating said output shaft either in a first rotational direction or in a second rotational direction that is an opposite direction to the first rotational direction while said armature is being rotated in one direction according to the rotational direction of said stub axle, wherein said switching means includes a reduction gear mechanism having:

a sun gear provided on said armature shaft;

a plurality of planetary gears engaged with said sun gear and revolved around said sun gear;

a supporting pin for supporting the rotation of said planetary gears and transmitting the rotation to said output shaft;

an internal gear having internal teeth engaged with said planetary gears;

a gear mounted on said supporting pin; and an external gear engaged with said gear on said supporting pin.

8. A power steering device according to claim 7, further comprising:

a regulating member for regulating either the rotation of said internal gear or that of said external gear to said switching means so that the direction of rotation transmitted from said armature shaft to said output shaft is changed.

9. A power steering device according to claim 8, wherein said regulating member is moved to regulate either the rotation of said internal gear or that of said external gear according to relative rotation between said stub axle and said pinion shaft.

10. A power steering device according to claim 7, further comprising:

a rotation transmitting member provided on a periphery of said output shaft for transmitting the rotation of said stub axle; and a helical spline coupling provided between said rotation transmitting member and said regulating member for changing the direction of the movement of said regulating member according to the rotational direction of said rotation transmitting member and regulating the rotation of said internal gear or that of said external gear.

11. A power steering device according to claim 7, wherein rotation is prevented from being transmitted between said armature shaft and said output shaft when the difference in a relative rotational angle between said stub axle and said pinion shaft is in the range of predetermined values.

* * * * *